United States Patent Office 3,347,887
Patented Oct. 17, 1967

3,347,887
PROCESS OF PREPARING TITANOXANE METALOXANE POLYMERS
Sydney Arthur Giddings, Darien, Conn., assignor to American Cyanamid Company, Stamford, Conn., a corporation of Maine
No Drawing. Original application Aug. 5, 1963, Ser. No. 300,070. Divided and this application Mar. 31, 1965, Ser. No. 444,457
1 Claim. (Cl. 260—429.5)

This application is a divisional of my copending application Ser. No. 300,070, filed Aug. 5, 1963, now U.S. Patent No. 3,226,369, which application is in turn a continuation-in-part of application Ser. No. 179,772, filed Mar. 14, 1962, now abandoned.

This invention relates broadly to a new and useful process of preparing metaloxane polymers and, more particularly to a new and improved process of preparing polymers from a substituted titanium halide whereby there are obtained polymers of an oxygen-containing compound of titanium.

In a more particular sense, the invention is concerned with the preparation of polymers derived from a compound represented by the general formula I 

wherein each Cp represents a radical selected from the group consisting of cyclopentadienyl and lower alkyl-substituted cyclopentadienyl radicals and each X represents a halogen selected from the group consisting of chlorine and bromine. The radicals represented by Cp may be the same or different. The polymers of the invention are obtained by contacting a compound of the kind embraced by Formula I with an anhydrous oxygen-containing gas, e.g., anhydrous air or oxygen itself, while the said compound is present, together with zinc particles, in an inert, anhydrous, liquid, reaction medium. Contacting of the reaction mass with the aforesaid oxygen-containing gas is continued until the optimum amount of polymer has been formed.

The polymers resulting from the method of the present invention contain the essential recurring unit represented by the general formula II 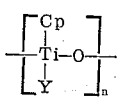

wherein each Cp has the same meaning as given above with reference to Formula I, Y is another Cp group and/or a chain of metaloxane polymeric material such as that of Formula II and $n$ is a number having an average value of at least 2, for example from 2 to 1,000 or more.

The reactions involved in the preparation of the polymers represented by Formula II by the method of this invention are believed to be those represented by the following, abbreviated general equations and which proceed concurrently:

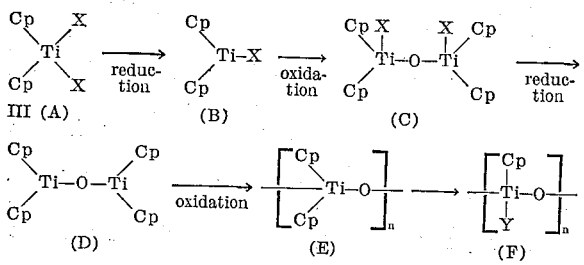

The method of the present invention provides a simple and relatively inexpensive technique for preparing thermally stable polymers with a metaloxane, specifically a titanoxane, backbone. Previous methods of preparing similar polymers involve either condensation reactions between reactants that are often difficult and expensive to prepare, or are difficult to condense, or yield thermally unstable polymers.

More particularly, the method of the instant invention is an improvement upon the method disclosed and claimed in my copending application Ser. No. 300,073, filed concurrently herewith. In that copending application there is disclosed and broadly claimed a method of preparing a synthetic polymer which comprises producing a polymer represented by Formula II by oxidizing a compound represented by the general formula IV 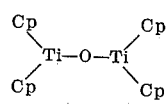

I also disclosed in my aforementioned copending application how the compound of Formula IV could be produced by reducing a compound represented by the general formula V 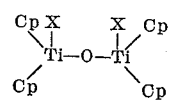

with a hydride selected from at least one member of the group consisting of the hydrides of boron and the alkali-metal boron hydrides. It is also disclosed in my aforementioned copending application that the compound of Formula V can be prepared by first reducing, with finely divided zinc, a dihalide represented by Formula I, supra, to a monohalide represented by the general formula VI 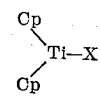

and then oxidizing this monohalide to the compound of Formula V by contacting it with an oxygen-containing gas in anhydrous state, e.g., anhydrous air or oxygen.

In the equations designated generally as III and in Formulas IV, V and VI, Cp, Y, X and $n$ have the same meanings as given above with reference to Formulas I and II.

The method of the present invention is much simpler than the method disclosed and claimed in my above-identified copending application, since it makes it possible to obtain, in a single step, the same kind of polymer resulting from the method of the aforesaid copending application from a bis(cyclopentadienyl)titanium dihalide of the kind embraced by Formula I.

No pertinent prior art is known. Thomas et al. Patent No. 2,983,740 discloses the compound represented by the formula $[(C_5H_5)_2TiCl]_2O$. Of incidental interest, also, are British Patent No. 793,354, which discloses the preparation of condensed cyclopentadienyl titane; and British Patent No. 793,355, which discloses bis(cyclopentadienyl)titanium dihalide.

Illustrative examples of lower alkyl-substituted cyclopentadienyl radicals represented by each Cp in the aforementioned formulas are the monomethyl-, dimethyl-, trimethyl- and tetramethylcyclopentadienyl radicals, and the mono- and poly- (i.e., di-, tri- and tetra-) ethyl-, propyl-, isopropyl-, n-butyl, isobutyl-, sec.-butyl, n-amyl-, isoamyl-, etc., cyclopentadienyl radicals.

In practicing the present invention a dihalide of the kind embraced by Formula I is placed in an inert, anhydrous (substantially completely anhydrous), liquid solvent (or diluent), e.g., in the form of a suspension and/or dispersion and/or solution, or the like.

Zinc particles, i.e., finely divided zinc, of a laboratory or a commercial grade are added to the aforementioned liquid reaction medium (solvent and/or diluent). The dihalide and zinc are used in at least chemical equivalent ratios such as to effect complete reduction of the dihalide; and, preferably, the zinc is used in excess of chemical equivalent ratios, e.g., from 1 mole percent to 50 mole percent in excess. I prefer to use as the liquid reaction medium an inert, anhydrous, liquid "solvent" (within which term is intended to be included both true solvents as well as diluents and mixtures of true solvents and diluents) selected from the group consisting of inert, anhydrous, liquid ethers and ketones. Optimum results have been obtained by the use of such ethers and ketones and which, of course, are free from reactive groups such, for example, as —OH groups.

As has been indicated hereinbefore, the liquid medium in which the reaction is effected is an anhydrous (substantially completely anhydrous), liquid medium which is inert (substantially completely inert) during the reaction; that is, one which is inert (non-reactive) toward the reactants and the reaction product during the reaction period. By "substantially completely anhydrous" liquid medium is meant one which contains no more than a trace of water or the amount of water that might be present in the commercial product. By "inert" or "substantially completely inert," liquid, reaction medium is meant one which is so inert or non-reactive toward the reactants and the reaction product that it will not affect the course of the reaction or the constitution of the reaction product. By "liquid reaction medium" is meant one which is liquid at the temperature and pressure employed in effecting the reaction. In other words, the inert, anhydrous, liquid, reaction medium may or may not be a liquid at room temperature or at any other temperature below the reaction temperature.

Advantageously the reaction medium is one in which compound III(A) is at least slightly soluble. Also, preferably, the liquid reaction medium is one which is volatile (volatilizable) without decomposition.

Illustrative examples of liquid reaction media that can be employed, including those of the preferred kind, are diethyl ether, di-n-propyl ether, di-isopropyl ether, di-n-butyl ether, di-n-amyl ether, the mixed normal and isomeric diamyl ethers, methyl butyl ether, diglycoldimethyl ether, tetrahydrofuran, tetrahydro-2-methylfuran, m-dioxane (1,3-dioxane), p-dioxane (1,4-dioxane), pentamethylene oxide, 2-methyl-1,3-dioxolane, N-methylmorpholine, N-ethylmorpholine, acetone, diethyl and the various other di-(lower alkyl) ketones, including both the normal and various isomeric forms, e.g., the normal and various isomeric dibutyl and diamyl ketones, methyl ethyl ketone, methyl propyl ketone, methyl butyl ketone, methyl amyl ketone, ethyl amyl ketone, methyl benzyl ketone, ethyl benzyl ketone, methyl phenyl ketone (acetophenone), etc. Preferably the liquid reaction medium is an ether and/or a ketone that boils below 200° C., and usually is one which boils below about 150° C., more particularly below about 100° C. Mixtures of different ethers may be used as the reaction medium; or mixtures of different ketones; or mixtures of ethers and ketones in any proportions. Mixtures of liquid aliphatic ethers and cyclic ethers in any proportions can be used as the reaction medium.

The ether and/or ketone liquid reaction medium can be used alone as the reaction medium or it can be employed in the form of an admixture with other liquid reaction media with which it is miscible, for instance, liquid aromatic hydrocarbons such, for example, as benzene, toluene, xylene, etc. In such admixtures the additive to the liquid ether and/or ketone liquid reaction medium may constitute, for example, from about 1% to about 75% by volume of the total volume of the said additive and the said ether and/or ketone liquid reaction medium.

The amount of inert, anhydrous, liquid, reaction medium employed may be varied as desired or as conditions may require, but ordinarily the amount thereof is such that the reactants constitute from about 1% to about 20% by weight thereof.

After adding the zinc particles to the liquid reaction medium containing a dihalide of the kind embraced by Formula I, the reaction mixture is contacted with an anhydrous (i.e., dry) oxygen-containing gas, e.g., dry air or oxygen itself. This gas can be bubbled into the reaction mixture while mechanically stirring the mass to keep the zinc in suspension; or one can obtain adequate contact between the titanium compound and the oxygen-containing gas merely by maintaining an atmosphere of the said gas over the liquid reaction mass while agitating (vigorously or fairly vigorously) the said mass.

The most economical and convenient source of oxygen is dry gaseous oxygen or dry air. If desired, an admixture (in any proportions, e.g., 50–50 percent by volume) of dry gaseous oxygen and a dry inert gas, e.g., nitrogen, helium, argon, krypton and the like, can be used.

Contacting of the reaction mass with the oxygen-containing gas is continued until the optimum amount, which may be the maximum amount, of polymer has been formed.

The temperature at which the simultaneous reducing and oxidizing reactions are carried out is usually room temperature (20°–30° C.), that is, in the absence of applied heat or only such heat as may be necessary to convert the reaction medium to liquid state, if it is not already in such state. Ordinarily, however, the reaction is carried out at the lowest possible temperature that will provide an optimum yield of polymer in minimum time. Such a temperature is usually within the range of from about —20° C. up to the boiling or reflux temperature of the reaction mass at atmospheric pressure. Superatmospheric pressures can be employed when it is desired to effect the reaction at a temperature above the boiling temperature of the reaction mass at atmospheric pressure.

At the end of the reaction period the polymer is separated from the unreacted zinc and liquid solvent by any suitable means. For example, the solvent containing the polymer can be decanted from the heavier settled zinc, and the polymer then separated from the solvent by filtration. Alternatively, the solvent can be evaporated or distilled off, leaving the polymer as a residue. Equipment of the kind used in minerals separation as presently commercially available, or modified if necessary for this particular application, can be used to separate the zinc particles from the solvent containing the polymer. The isolated polymer, if desired in a purer state, is then washed, e.g., with water, to remove any water-soluble inorganic salts formed as by-products of the reaction.

The polymer which is produced by means of the present invention and exemplified by Formula III(E) is unstable and readily converts to a cross-linked polymer in which the average number of Cp groups per titanium atom reduces significantly. The cross-linking reactions can occur on standing in solution, during the isolation of the polymer or while it is a solid material. From the carbon to titanium atomic ratio, which indicates the ratio of Cp groups to titanium atom in the polymeric units it can be said that the ratio may be from about 5.2 to 7 and more usually about 5.5 to 5.9. Theoretically the carbon to titanium atomic ratio of a dicyclopentadienyl substituted polymeric unit is 10:1. Thus it can be seen that for carbon ratios of 5.5–5.9:1, there are two Cp groups for every 6th or 10th titanium atom in the polymer chain. Referring to Formula III(F), Y is a Cp group for every 6th or 10th titanium atom in the polymer and the other titanium atoms are cross linked.

The polymers resulting from the method of this invention are generally yellow, relatively soft, infusible powders as normally obtained. They are stable in air and also have relatively high thermal stability. They are insoluble in most of the common organic solvents, e.g., benzene, toluene, xylene, acetone, diethyl ether, dioxane and others such as those identified in my aforementioned copending application. The polymer derived from bis(cyclopentadienyl)titanium dichloride is stable upon heating to 250°–260° C. but slowly decomposes with an increase in temperature above that point.

Alternatively, polymers of the present invention can also be obtained by a metathetical reaction involving the compound of Formula I with silver oxide to produce silver chloride and the polymer in accordance with the following equation:

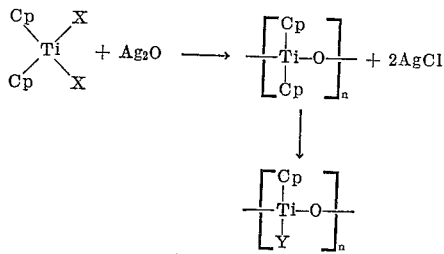

wherein Cp, X, Y and $n$ are the same as defined in Equation III.

The polymers produced by the method of this invention are useful, for example, as pigments and as modifiers of thermoplastic and thermosetting resinous compositions of all kinds. They are particularly useful as components of thermoplastic and thermosetting resinous materials having a relatively low thermal stability in order to improve the stability of such resins against heat. For example, they may be used advantageously as fillers and/or pigments in polystyrene molding compositions (including expandable or foamable polystyrene) in order to increase the resistance of the molded article to heat.

In order that those skilled in the art may better understand how the present invention can be carried into effect, the following examples are given by way of illustration and not by way of limitation. All parts and percentages are by weight unless otherwise stated.

Example 1

Bis(cyclopentadienyl)titanium dichloride (30 g.; 0.12 mole) in 500 ml. of anhydrous acetone containing 20 g. (0.30 mole) of granular zinc is vigorously stirred with a mechanical stirrer for 4 hours while maintaining an atmosphere of dry air over the reaction mass. Agitation is sufficient to provide intimate contact of the dry air with the reaction mass. A yellow polymer is formed with an analysis of 37.75% carbon, 3.73% hydrogen and 30.8% titanium, on a weight basis.

The polymer is recovered by decanting the solution containing it from the unreacted zinc, and then filtering the said solution to isolate the crude polymer. The crude polymer is purified by washing it with water to extract any water-soluble salts formed as by-products of the reaction. Analysis establishes that it consists essentially of the recurring unit structure

VII

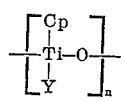

wherein each Cp represents an unsubstituted cyclopentadienyl radical and Y has the same meaning as in Equation III. It is insoluble in benzene, toluene, xylene, acetone, diethyl ether, dioxane and other common organic solvents. It can be used, for example, as a modifier of thermoplastic and thermosetting synthetic resins, for instance as a modifier of a melamine-formaldehyde resin in the same manner as described under Example 5 of my aforementioned copending application and wherein was illustrated a similar use of the polymer of Example 1 of that application.

Example 2

Example 1 is repeated exactly with the exception that, instead of the particular substituted titanium dihalide used in that example, there is used an equivalent molar amount of bis(cyclopentadienyl)titanium dibromide; instead of 500 ml. of anhydrous acetone, there is employed 500 ml. of anhydrous tetrahydrofuran; and instead of using dry air as in Example 1, dry gaseous oxygen is bubbled directly into the reaction mass throughout the reaction period which is 5 hours instead of 4 hours as in Example 1. A yellow polymer similar in appearance and in characteristics to the product of Example 1 is obtained.

Example 3

Example 1 is repeated exactly with the exception that there is employed an equivalent molar amount of bis(methylcyclopentadienyl)titanium dichloride instead of the particular substituted titanium dihalide used in that example; instead of 500 ml. of anhydrous acetone there is employed 500 ml. of anhydrous methyl ethyl ketone; the reaction temperature is 50°–60° C. instead of room temperature; and the reaction time is 3 hours instead of 4 hours as in Example 1. The isolated and purified polymer has the same yellowish appearance and characteristics as the product of Example 1.

Example 4

Essentially the same procedure is followed as described under Example 1 with the exception that, in place of the particular substituted titanium dihalide used in that example, there is employed an equivalent molar amount of cyclopentadienyl methylcyclopentadienyl titanium dichloride; and in place of 500 ml. of anhydrous acetone, there is used 500 ml. of anhydrous diisopropyl ether. The isolated and purified product is a yellow polymer which is similar in appearance and characteristics to the polymer of Example 1.

Example 5

Equimolar quantities of bis(cyclopentadienyl)titanium dichloride and silver oxide were stirred for 16 hours in acetone at room temperature. A yellow precipitate and pale red solution were obtained. Physical examination of the yellow precipitate showed that it was similar to the product of Example 1.

I claim:

The method of preparing a synthetic polymer which comprises reacting a bis(cyclopentadienyl)titanium dihalide with silver oxide in an inert, anhydrous liquid solvent selected from the group consisting of inert anhydrous liquid ethers and ketones and separating the precipitated polymer product from the reaction mixture.

References Cited

UNITED STATES PATENTS 2,983,740　5/1961　Thomas et al. ____ 260—429.5 X
3,306,919　2/1967　Brantley et al. _____ 260—429.5

TOBIAS E. LEVOW, Primary Examiner.

H. M. S. SNEED, Assistant Examiner.